(12) United States Patent
Feichtinger

(10) Patent No.: US 6,507,292 B1
(45) Date of Patent: Jan. 14, 2003

(54) POSITIONAL ENCODER ASSEMBLY

(75) Inventor: Kurt Feichtinger, Palling (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 48 days.

(21) Appl. No.: 09/667,743

(22) Filed: Sep. 22, 2000

(30) Foreign Application Priority Data

Sep. 27, 1999 (DE) .......................... 199 48 106

(51) Int. Cl.[7] .............................. H03M 1/22
(52) U.S. Cl. ..................... 341/16; 341/6; 439/493
(58) Field of Search ............... 341/16, 6, 10; 250/231; 439/493, 395

(56) References Cited

U.S. PATENT DOCUMENTS 4,279,513 A * 7/1981 Tucker ..................... 356/389
RE31,995 E * 10/1985 Ball ........................ 339/113 R
4,703,176 A * 10/1987 Hahn et al. ................ 250/231
4,864,300 A * 9/1989 Zaremba ..................... 341/6
5,086,221 A * 2/1992 Ishihara et al. ......... 250/231.13
6,231,377 B1 * 5/2001 Fernsebner ................. 439/493

FOREIGN PATENT DOCUMENTS

GB          2 134341     *  8/1984     ............ G08C/9/16

* cited by examiner

Primary Examiner—Brian Young
Assistant Examiner—John Nguyen
(74) Attorney, Agent, or Firm—Sidley Austin Brown & Wood, LLP

(57) ABSTRACT

A positional encoder assembly including a positional encoder, an interface unit releasably connectable with the positional encoder for connecting the positional encoder with a data bus, and connection elements providing for connection of the interface unit with the positional encoder and for disconnection of the interface unit therefrom upon displacement of the interface unit relative to the positional encoder.

8 Claims, 4 Drawing Sheets

POSITIONAL ENCODER ASSEMBLY

BACKGROUND OF THE INVENTION

1. Field of the Invention

The present invention relates to a positional encoder assembly including a positional encoder and an interface unit releaseably connected with the positional encoder for connecting the positional encoder with a data bus.

2. Description of the Prior Art

Positional encoder assemblies which include a positional encoder, in particular a rotary encoder, which transmits data of operational condition of a drive shaft of a drive unit, via data buses, to an evaluating unit connected downstream of the positional encoder, are known. The positional encoder has a housing, and an interface unit is connected with the housing for connecting the positional encoder with the data bus.

The interface unit is releasably attached to the housing of the positional encoder with screws. The electrical connection between the electronics of the interface unit and the electronics arranged in the housing of the positional encoder is effected by axially pinning the interface unit onto the housing.

The drawback of the known positional encoder assembly consists in that an access to the screws, with which the interface unit is secured to the housing of the positional encoder, is often very difficult after the positional encoder assembly has been mounted on the drive unit. In most cases, the screws can be released with specifically produced screw drivers. Another drawback of the known positional encoder assembly consists in that the electrical connections between the interface unit and the electronics of the positional encoder are hidden in the mounted condition of the interface unit and are, therefore, not accessible and cannot be controlled.

Accordingly, an object of the present invention is a positional encoder assembly having an easily releasable connection of the interface unit with the positional encoder.

SUMMARY OF THE INVENTION

This and other objects of the present invention, which will become apparent hereinafter, are achieved by providing connection means that enable connection and disconnection of the interface unit with and from, respectively, the positional encoder upon displacement of the interface unit relative to the positional encoder.

According to the present invention, the positional encoder assembly includes positional encoder, an interface unit for connecting the positional encoder with a data bus, and connection means which provides for connection of the interface unit with the positional encoder and for disconnection of the interface unit therefrom upon displacement of the interface unit relative to the positional encoder. The interface unit contains adaptive electronics for transmission of the output signals of the positional encoder to the data bus. Preferably, the adaptive electronics includes a memory for storing specific parameters of the positional encoder which can be transmitted back to data bus for an identification of the positional encoder. The connection means for connecting the interface unit with the positional encoder are so formed that the interface unit can be connected with the positional encoder or disconnected therefrom by simply displacing the interface unit in opposite directions.

The advantage of the present invention consists in that the interface unit can be mounted on the positional encoder and dismounted therefrom after the positional encoder has been mounted on the drive unit. A particular advantage of the present invention consists in that the connection of the interface unit with the positional encoder and the disconnection therefrom can be effected with a single movement of the interface unit. A further advantage consists in that no tool is necessary for connecting the interface unit with the positional encoder and its disconnection from the positional encoder.

According to the first embodiment of the present invention, the connection means is so formed that the relative displacement of the interface unit with respect to the positional encoder has a component acting a direction of the positional encoder and a component acting in opposite direction, away from the encoder. In other words, the connection means is so formed that the interface unit moves toward the positional encoder or away from it. Preferable, the interface unit is mounted on the positional encoder or is dismounted therefrom along the positional encoder axis. Alternatively or in addition, the connection and disconnection of the interface unit with or from, respectively, the positional encoder is effected by rotating the interface unit about the longitudinal axis of the positional encoder.

According to an advantageous embodiment of the present invention, the connection means is formed as thread means, e.g., a coarse thread is provided on the outer circumference of the interface unit and cooperates with a corresponding thread provided on the inner circumference of the positional encoder. Such outer and inner threads can be easily formed.

According to a further embodiment of the present invention, the connection means is formed as locking means. Particularly advantageous is when the locking means is formed as a bayonet connection or lock. With such connection means, a particularly simple and reliable connection of the interface unit with the positional encoder is insured. The release of the interface unit is also very easy.

According to present invention, the locking means includes at least one locking lug provided on the positional encoder, and at least one locking opening formed in the interface unit. Alternatively or in addition, a locking lug can be provided on the interface unit, with a corresponding locking opening being formed in the positional encoder. With both embodiments of the locking means, it is contemplated to provide the locking opening with a bevel arranged in such a manner that the locking lug, upon displacement along the bevel during establishing of a connection between the interface unit and the positional encoder, presses the interface unit in a direction of the positional encoder. Alternatively or in addition thereto, the locking opening can be provided with a bevel arranged in such a manner that the locking lug, upon displacement along the bevel, presses the interface unit in a opposite direction, away from the positional encoder.

The bevels substantially facilitate connection of the interface unit with the positional encoder and its disconnection therefrom.

According to a still further embodiment of the present invention, the connection means includes a spring member which can be arranged on the interface unit or the positional encoder and which enables to lock the locking connection, e.g., with such spring member, upon mounting of the interface unit on the positional encoder, the interface unit need be displaced against the baiting force of the spring member, whereby the connection is made more reliable. The spring excursion is used to insure the locking of the locking lug in the locking opening. The spring member is formed preferably as an O-ring arranged in a groove formed on the circumference of the positional encoder.

In accordance with a further advantageous embodiment of the present invention, the connection means includes a sealing which seals the connection between the interface unit and the positional encoder. This embodiment is preferably used where the cooling fluid or the oil can reach the electronics of the positional encoder and destroy it.

In accordance with a still further embodiment of the present invention, the connection means are asymmetrically arranged, with respect to a common axis of the positional encoder and the interface unit, on the positional encoder and the interface unit. Such asymmetrical means insures that the interface unit can occupy only a single predetermined position with respect to the positional encoder. The advantage of the asymmetrical connection means consists in that the electrical and electronic conductors for the positional encoder assembly and the electrical connections within the positional encoder assembly always occupy their predetermined position.

According to yet another embodiment of the present invention, the connection between the positional encoder and the interface unit is secured with appropriate safety means provided in the positional encoder and/or interface unit. Preferably, the safety means is formed as formlockingly engaging means, such as a snap-in connection, e.g., the safety means can be formed as a formlockingly engaging element engageable into the locking bug and/or locking groove, which establish the locking connection between the interface unit and the positional encoder. Such safety means prevents an unintended disconnection of the interface unit from the positional encoder. A member which is formed of a spring steel sheet and is arranged on the positional encoder, proved to be particularly suitable for securing the connection between the interface unit and the positional encoder.

The safety means and the connection means need not be provided in the same location on the positional encoder and/or the interface unit. Rather, the safety means and the connection means can be provided in different locations of the positional encoder and the interface unit.

The interface unit preferably has a plug-in connection means connectable with the electronics of the positional encoder. This is effected advantageously with flexible conductors. Thereby, in distinction from the state of the art, an open and, thus controllable electrical connection between the electronics of the interface unit and the electronics of the positional encoder is insured.

In a particularly preferred embodiment of the positional encoder assembly, as described above, the interface unit is mounted on the positional encoder housing. However, the interface unit can be mounted on any other part of the positional encoder, e.g., on attachment flange.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
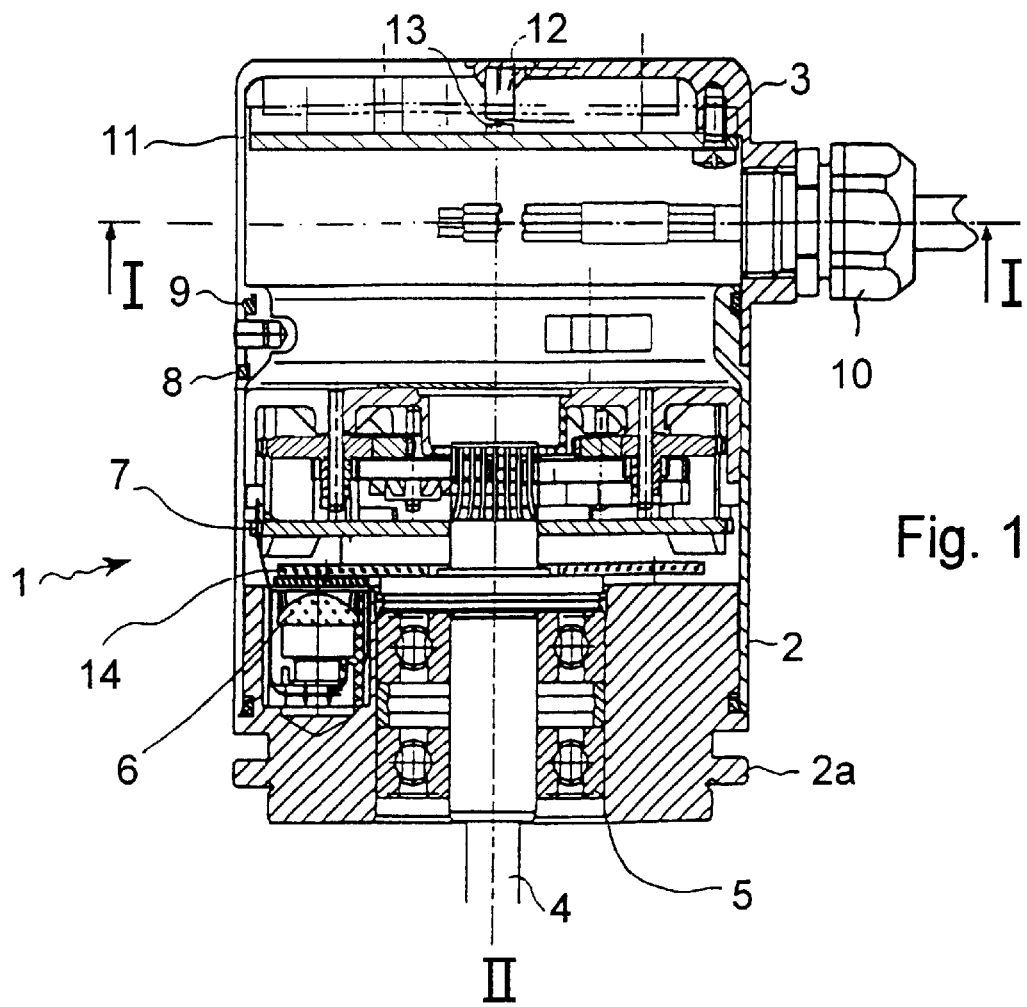
FIG. 1 a cross-sectional view of a positional encoder assembly including a positional encoder the housing of which is connected with an interface unit for connecting the encoder with a data bus.

A positional encoder assembly according to the present invention, which is shown in FIG. 1, includes a positional encoder 1 which is formed as a rotary encoder for a drive shaft of a drive unit (not shown). The drive shaft 4 extends into a housing 2 of the encoder 1 and is rotatably supported in a housing lower portion 2a with two bearings 5.

The positional encoder assembly 1 operates on the principle of an already known photoelectrical scanning encoder and includes a light source arranged in the housing 2, a graduation disc 14 (scale) with a grating structure, and a plate or disc 7 with photoelements. The light, which is emitted by the light source 6, is directed to the graduation disc 14. Behind the graduation disc 14, there is generated a shadow image of the grating structure which is scanned by photoelements provided on the plate 7. The signals, which are generated by the photoelements, are transmitted to an interface unit 3.

The interface unit 3 is releasably connected with the housing 2 and serves for connecting the positional encoder with a data line, especially a data bus 100 from which the data, which are obtained by the positional encoder are transmitted to an evaluation unit, in particular, NC-unit. However, the present invention is directed not to the positional encoder and its functions per se but to the connection of the positional encoder with the interface unit. The present invention, however, is not limited to the connection of the interface unit with the housing in a manner shown in FIG. 1. According to other embodiments, the interface unit can be connected with other elements of the positional encoder, e.g., a flange provided on the encoder.

The interface unit 3 includes a plate 11 on which the electronics, which is necessary for connection with the data bus, is arranged. The plate 11 further includes light diodes 13 the light of which is transmitted from the interface unit via a light guide 12. The light diodes 13 show the operational conditions of the positional encoder assembly 1. In particular, the light diodes 13 show whether the data bus active and/or whether the distribution voltage is fed to the positional encoder assembly. The distribution voltage is fed via one or several leads 10 and is transmitted via the interface unit 3 to further electronic components of the positional encoder assembly 1, e.g., to the light source 6.

Figure 2:
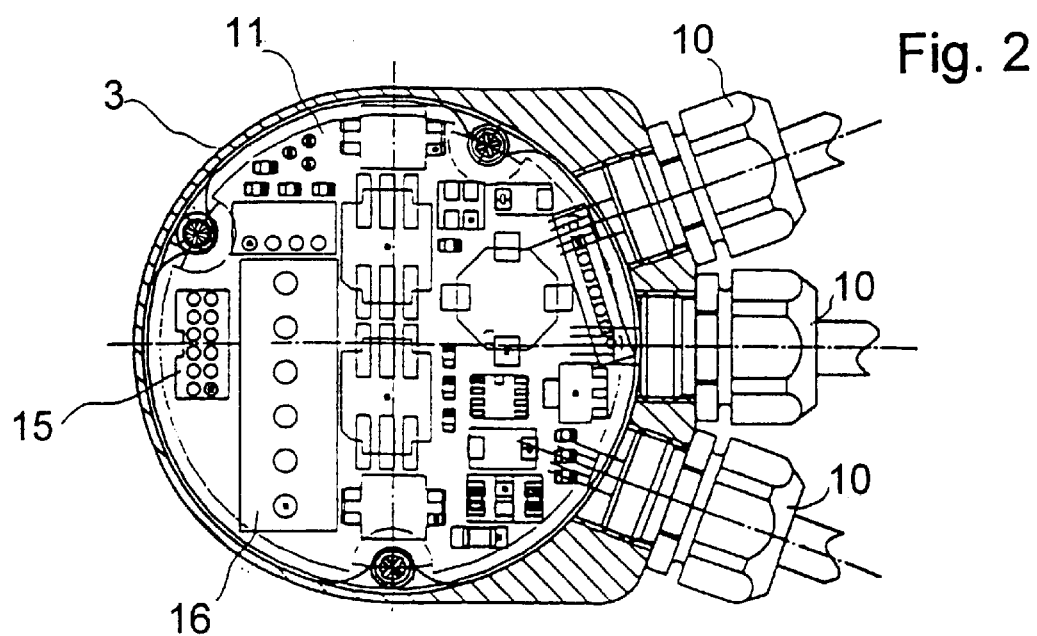
FIG. 2 a sectional view along ling A—A in FIG. 1.

As shown in FIG. 2, which shows a cross-section of the interface unit 3, the plate 11 of the interface unit 3 is releasably secured thereto with screws and has a connection unit 16 to which a distribution voltage for the positional encoder assembly is fed, on one hand, and which serves for the connection of the positional encoder assembly with the data bus, on the other hand. The data bus is connected with the interface unit 3 by other leads 10. The other leads 10 serve for transmitting the data obtained by the positional encoder assembly 1 to the evaluation unit, e.g. NC-unit, and from the evaluation unit to the positional encoder.

The plate 11 further includes a plug socket 15 for receiving a flexible conductor which connects the electronics of the interface unit 3 provided on the plate 11 electrically and/or electronically with other electronic components of the positional encoder assembly 1. In this way, electrical and electronic connection of the electronics of the positional encoder with the electronics of the interface unit 3 is effected not by simply pinning the interface 3 up on the encoder housing 2. Rather, in the disclosed embodiment the electronic and electrical connections are effected with separate flexible conductors which are plugged-in the plug socket 15 before the interface unit 3 is connected with the encoder housing 3. This insures an open end controllable electrical and/or electronic connection of the electronics of the positional encoder with the electronics of the interface unit. However, the present invention does not exclude a connection which can be effected in a covered condition.

Below, the connection of the housing 2 with the interface unit 3 will be described in detail with reference to FIGS. 3—4. The interface unit 3 is releasably connected with the housing 2 by a locking arrangement formed as a bayonet lock. To this end, there is provided on the housing 2a lug 17 engageable in a locking opening 18 provided on the interface unit 3. The above-discussed bayonet connection is shown at an increased scale in FIG. 4. For connecting the interface unit 3 with the housing 2, it is placed on the housing 2 and is rotated about the axis B of the housing so that the locking lug 17 engages in the locking opening 18. An O-ring 8 which, as shown in FIG. 1, is located on an outer circumference of the housing 2 in a groove provided thereon, serves as a spring member providing a certain spring excursion. This spring excursion is used for locking the locking lug 17 in the locking opening 18.

The advantage of the above-discussed embodiment consists in that that the interface unit 3 itself can be easily releasably mounted on the housing 2 and be dismounted therefrom after mounting the positional encoder on the drive unit. Contrary to the state of the art, this is effected with a movement of the interface unit 3 relative to the housing 2 of the positional encoder.

Figure 3:
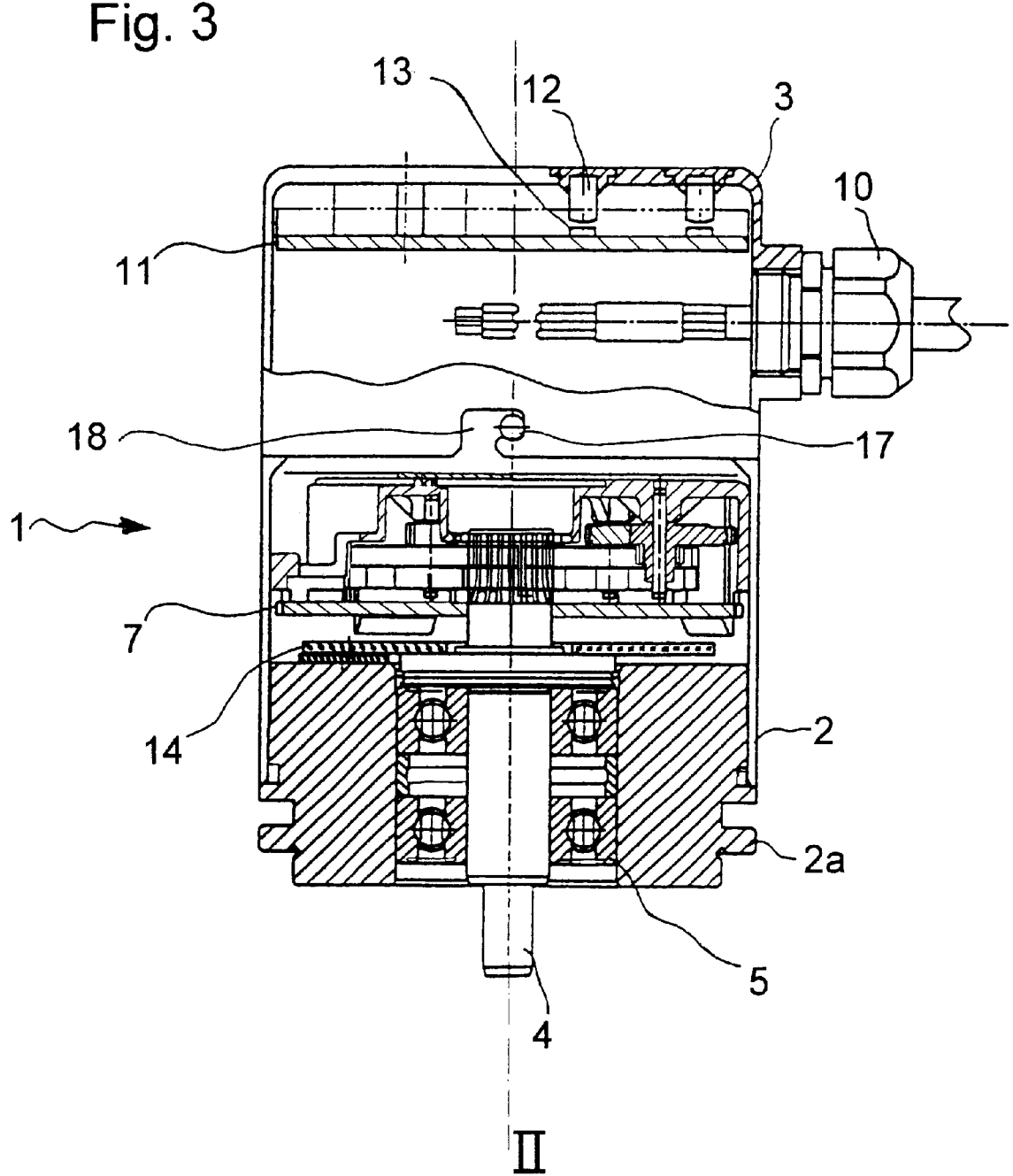
FIG. 3 a cross-sectional view of another embodiment of the positional encoder assembly.
Figure 4:
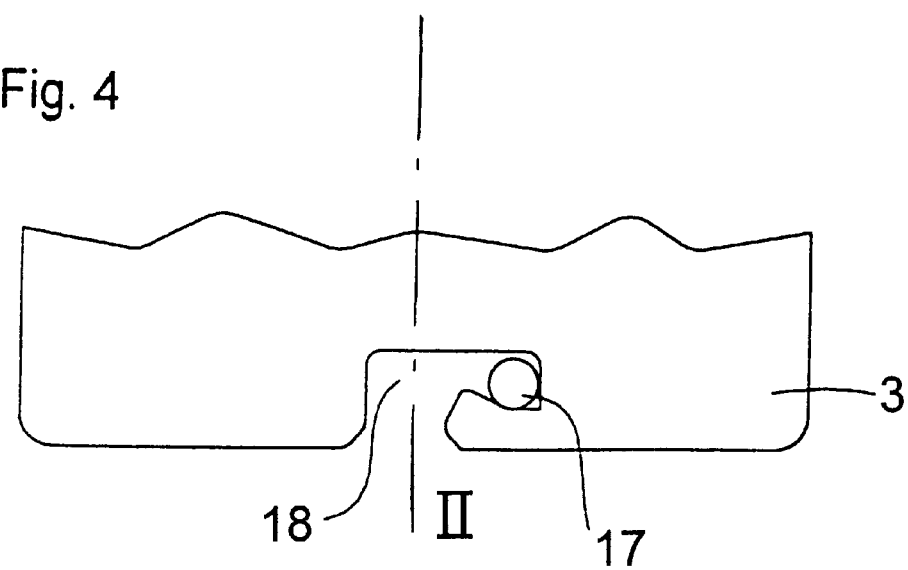
FIG. 4 a schematic view showing, at an increased scale, connection means for connecting the positional encoder housing with the interface unit and formed as a bayonet lock.

Alternatively to the arrangement shown in FIGS. 1 and 3, the locking opening 18 can be provided on the housing 2, and the locking lug 17 can be provided on the interface unit 3. Instead of a snap-in connection, the interface unit 3 can be connected with the encoder housing 2 by a thread connection, with the matching threads being provided, respectively, on outer and inner circumferences of the housing 2 and the interface unit 3.

In the embodiment shown in FIG. 1, after the connection of the interface unit 3 with the housing 2, the connection is sealed with a second O-ring 9 provided on the circumference of the housing 2 and located in groove formed therein. This embodiment is used in cases where cooling medium or oil can reach the electronics arranged in the housing 2 and destroy it.

Figure 5:
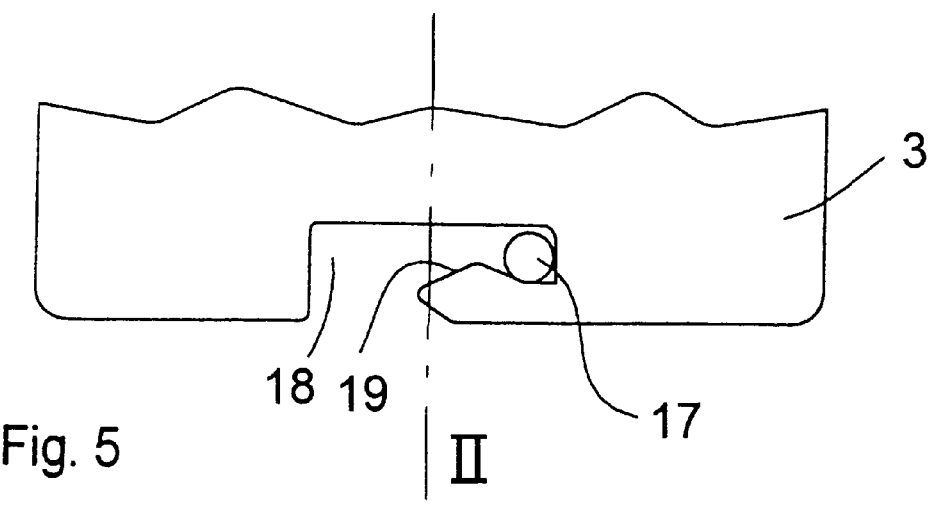
FIG. 5 a schematic view showing a bayonet lock with a single bevel.
Figure 6:
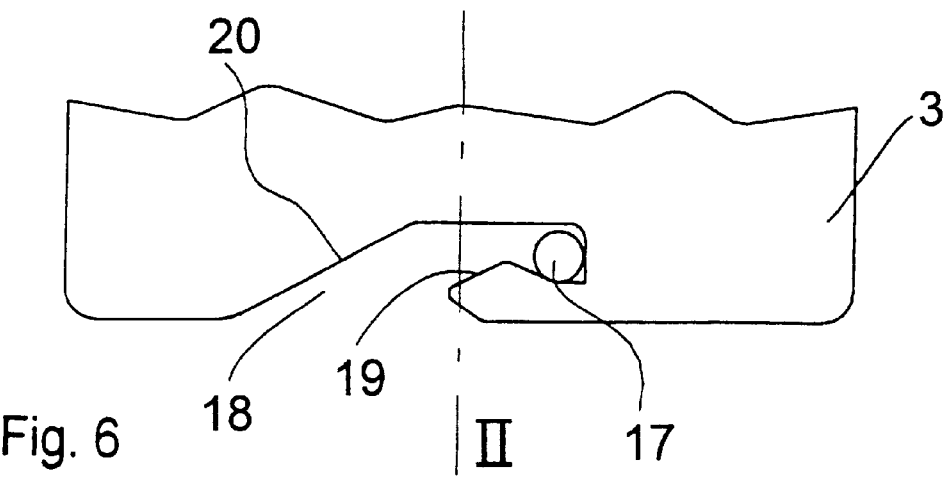
FIG. 6 a schematic view showing a bayonet lock with two bevels.

Further advantageous embodiment of the snap-in connection of the interface unit 3 with the encoder housing 2 are shown in FIGS. 5–6.

In these embodiments, the locking lug 17 is provided on the encoder housing (now shown here). FIG. 5 shows the locking opening 18, which is provided on the interface unit 3, with a single bevel 19, whereas in the embodiment shown in FIG. 6, the locking opening 18, which is likewise provided on the interface unit 3, has two bevels 19 and 20. A bevel represents an inclined surface formed on the surface defining the locking opening 18.

The bevels 19 and 20 have different functions. Thus, during the establishing of connection between the interface unit 3 and the encoder housing 2, i.e., when the interface is rotated relative to the housing 2, the locking lug 17, which is displaced along the level 19, presses or biases the interface unit 3 in the direction of the housing 2. In this way, the interface unit 3 is advanced on the housing 2. The above-described action of the O-ring 8 causes further rotation of the interface unit 3, leading to a locking engagement of the locking lug it in the locking opening 18.

The bevel 20, which is shown in FIG. 6, has a function opposite to that of the bevel 19. Upon release of the connection between the interface unit 3 and the encoder housing 2, i.e., during the opposite direction of rotation of the interface unit 3 relative to the housing 2 about the housing axis B, the locking lug 17 is displaced along the bevel 20 and, as a result of the inclination of the bevel 20, the interface unit 3 is lifted of the housing 2, and upon a complete displacement of the locking lug 17 along the level 20, the interface unit 3 is completely released from the housing 2.

Thus, the connection between the interface unit 3 and the housing 2 of the positional encoder is effected by the provision of one single locking arrangement which provides for an easy connection of the interface unit 3 with the housing 2 and an easy release of the connection. Advantageously, however, there are provided several locking, snap-in-arrangements for the connection of the interface unit 3 with the housing 2, which are arranged, e.g., on the circumference of the housing 2 and/or of the interface unit 3 and are spaced from each other by an angle, e.g., of 90°. The above-described bevels are provided at least in one of the locking openings 18.

An asymmetrical arrangement of the locking arrangements is also possible. Such an asymmetrical arrangement insures that the interface unit 3 can occupy only one predetermined position with respect to the encoder housing 2. In this case, the flexible conductor occupies also a predetermined position. The leads, 10, in this case, likewise extend in predetermined directions.

Figure 7:
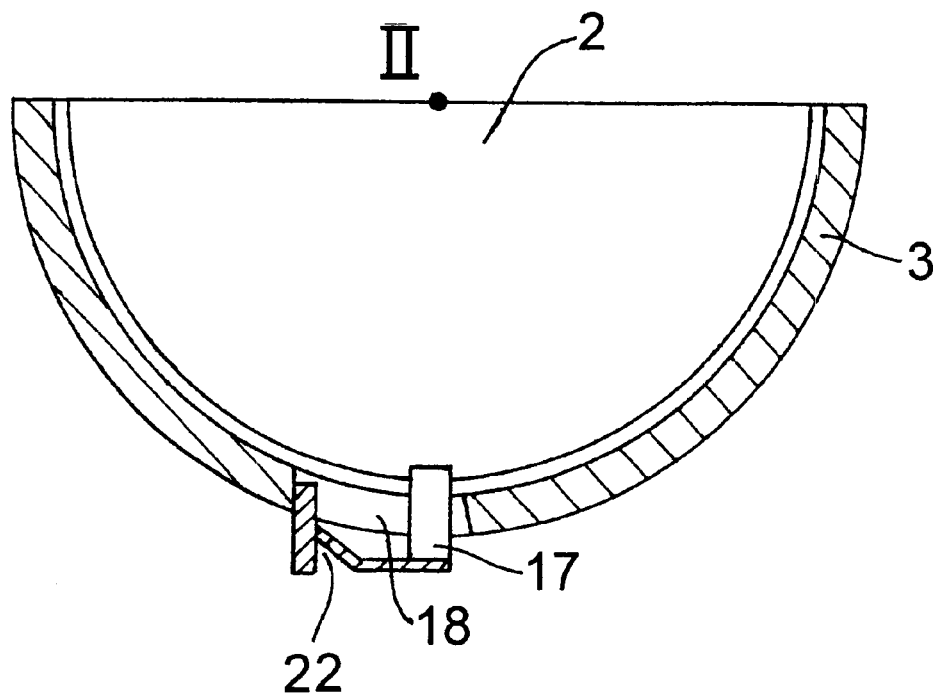
FIG. 7 a cross-sectional view of safety means for securing the connection of the encoder housing with the interface unit and formed as a spring steel element.
Figure 8:
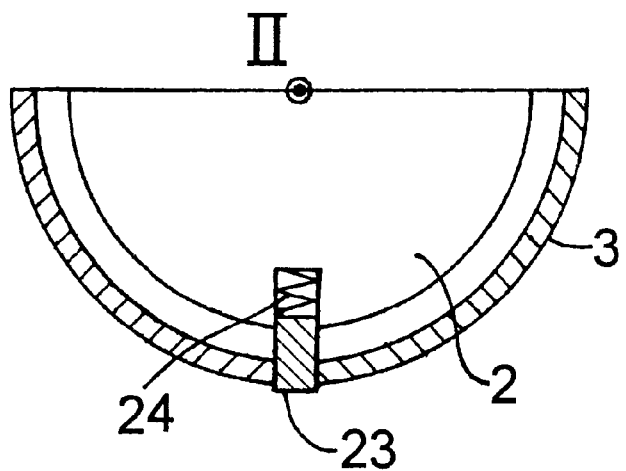
FIG. 8 a cross-sectional view of a safety means formed as a snap-in connection.

In the above-described embodiments, after the connection of the interface unit 3 with the encoder housing is established, the connection is secured with safety means which prevent an intended release of the connection. Such safety means is shown in FIGS. 7–8. In the embodiment shown in FIG. 7, which shows only two elements of the housing 2 and the interface unit 3, a spring steel member 22 is secured on the locking lug 17. After the connection of the interface unit 3 with the housing 2, the spring steel member 22 engages in the locking opening 18 of the interface unit 3 and, thereby, prevents an untended release of the connection between the interface unit and the encoder housing 2. For release of the connection between the interface unit 3 and the housing 2, the spring steel member 22 is displaced out of the locking opening 18 until it becomes disengaged from the locking opening 18, and the interface unit 3 can be rotated relative to the housing 2.

In the alternative embodiment of the safety means shown in FIG. 8, a locking member 23 is provided in an opening formed in the outer circumference of the housing 2. The locking member 23 is biased out of the opening by a spring 24, which is supported, at its other end, against the bottom of the opening.

After the establishing of the connection between the interface unit 3 and the housing 2, the locking member 23 extends into a complementary opening provided on the interface unit 3. For releasing the connection, the locking member 23 is pressed against the spring 24 into the housing opening until the interface unit 3 can be rotated relative to the housing 2.

Alternatively to the safety means shown in FIGS. 7–8, the safety means can be so formed that it forms part of the connection means for connecting the interface unit 3 with the encoder housing 2, or surrounds the same.

The present invention is not limited to a rotary encoder. Rather it can be used in any positional encoder assembly including a positional encoder and interface unit for connecting the positional encoder with a data bus.

Accordingly, though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A positional encoder assembly, comprising a positional encoder; an interface unit releasably connectable with the positional encoder for connecting the positional encoder with a data line; and connection means providing for connection of the interface unit with the positional encoder and for disconnection of the interface unit therefrom upon displacement of the interface unit relative to the positional encoder, wherein the connection means comprises snap-in locking means, and wherein the snap-in locking means comprises a bayonet lock.

2. A positional encoder assembly as set forth in claim 1, wherein the bayonet lock comprises a locking lug provided on the positional encoder and a locking opening formed on interface unit.

3. A positional encoder assembly as set forth in claim 1, wherein the bayonet lock comprises a locking by provided on the interface unit and a locking opening formed on the positional encoder.

4. A positional encoder assembly as set forth in claim 2, wherein the locking opening has at least one bevel arranged in such a manner that the locking lug, upon displacement therealong during establishing of a connection between the interface unit and the positional encoder, presses the interface unit in a direction of the positional encoder.

5. A positional encoder assembly as set forth in claim 2, wherein the locking opening has at least one bevel arranged in such a manner that the locking lug, upon displacement therealong during disconnection of the interface unit from the positional encoder, presses the interface unit in a direction away from the positional encoder.

6. A positional encoder assembly as set forth in claim 3, wherein the locking opening has at least one bevel arranged in such a manner that the locking lug, upon displacement therealong during establishing of a connection between the interface unit and the positional encoder, presses the interface unit in a direction of the positional encoder.

7. A positional encoder assembly as set forth in claim 3, wherein the locking opening has at least one bevel arranged in such a manner that the locking lug, upon displacement therealong during disconnection the interface unit from the positional encoder, presses the interface unit in a direction away from the positional encoder.

8. A positional encoder assembly as set forth in claim 1, wherein the bayonet lock comprises a locking lug provided on one of the positional encoder and the interface unit and a locking opening formed on another of the positional encoder and the interface unit, and wherein the positional encoder assembly further comprises safety means for securing connection of the interface unit with the positional encoder and formed as a spring steel sheet member arranged on the locking lug and formlockingly engaging in the locking opening.

* * * * *